(No Model.)

H. P. WILLARD.
CAR AXLE.

No. 458,671. Patented Sept. 1, 1891.

Witnesses.

Inventor.
Hiram P. Willard
by
Hazard & Townsend
his atty.

UNITED STATES PATENT OFFICE.

HIRAM P. WILLARD, OF TUSTIN, CALIFORNIA.

CAR-AXLE.

SPECIFICATION forming part of Letters Patent No. 458,671, dated September 1, 1891.

Application filed April 21, 1891. Serial No. 389,739. (No model.)

*To all whom it may concern:*

Be it known that I, HIRAM P. WILLARD, a citizen of the United States, residing at Tustin, in the county of Orange and State of California, have invented a new and useful Improvement in Adjustable Car-Axles, of which the following is a specification.

The object of my invention is to produce an axle of this class which combines strength, lightness, and simplicity, and will be dust-proof and can be made practically anti-friction.

The accompanying drawings illustrate my invention.

Figure 1:
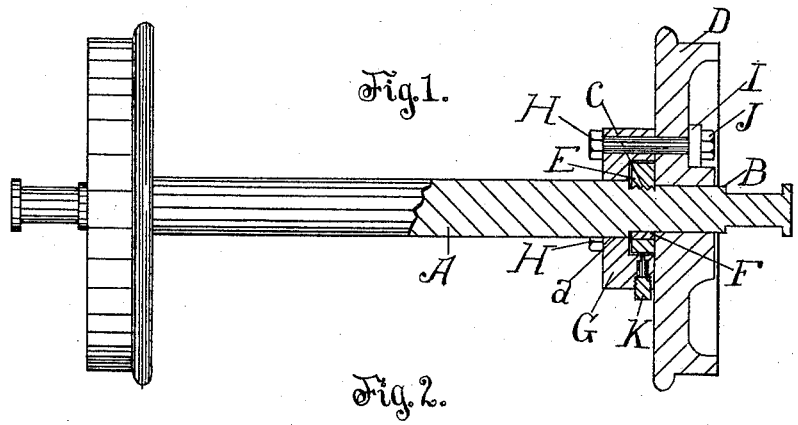
Figure 2:
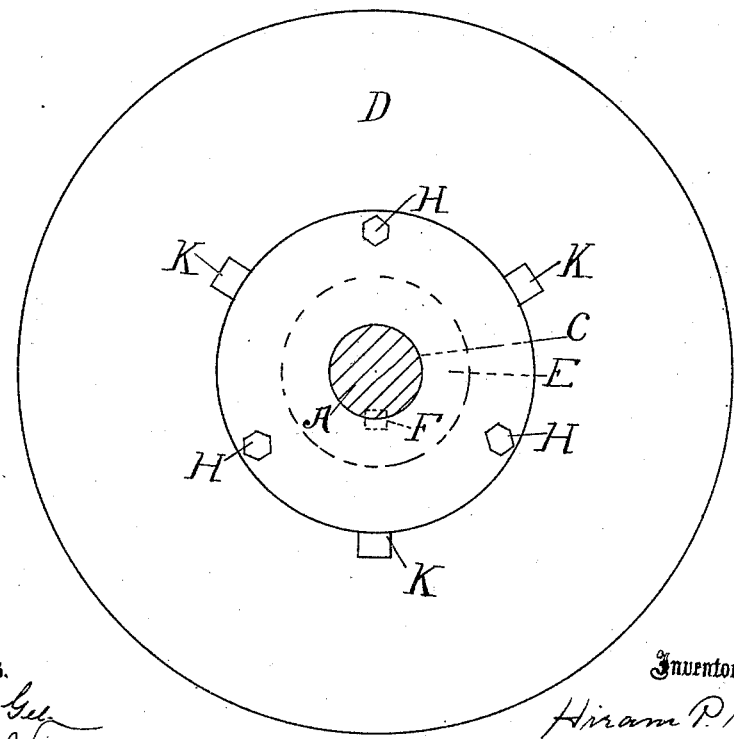

Figure 1 is a plane elevation of the axle and wheels, showing the free wheel and one end of the axle and the connecting devices in mid-section. Fig. 2 is a face view of the wheel and connecting devices, showing the axle in cross-section.

My invention comprises the combination of an axle provided with a wheel-bearing arbor at one end, a portion of the axle adjacent to the inner end of such arbor being provided with screw-threads, a circular or cylindrical nut of greater diameter than the said axle and screwed upon such threaded portion of the axle, means for locking such nut upon the axle, a cylindrical cap encircling the axle and provided with an annular recess fitted to receive the projecting portion of the cylindrical nut, a car-wheel mounted upon the wheel-arbor, and means for securing the cylindrical cap and the car-wheel together.

A is the axle, provided at one end with the wheel-bearing arbor B and with the screw-thread C.

D is the free wheel, journaled upon the arbor.

E is a circular nut screwed upon the axle and secured by the nut-key F.

G is an integral cap journaled upon the circular nut E and body $a$ of the axle and secured to the wheel by the bolts H and nuts I J.

In practice I adjust the several parts as follows: First I place the cap G upon the axle with its cap or facing chamber G facing outward. Then the circular or cylindrical nut E is screwed into place and secured by the key F. The wheel is then placed upon the arbor and secured to the cap by first screwing the bolts H into the nuts I and then screwing the set-nuts J into place. The cap is provided with suitable oiling devices K K, whereby oil may be introduced to lubricate the bearings of the wheel.

Now, having described my invention, what I claim as new, and desire to secure by Letters Patent, is—

The combination of an axle provided with a wheel-bearing arbor at one end, a portion of the axle adjacent to the inner end of such arbor being provided with screw-threads, a circular nut of greater diameter than the axle screwed upon such threaded portion of the axle, means for locking such nut upon the axle, a cylindrical cap encircling the axle and provided with the annular recess fitted to the projecting portion of the cylindrical nut, a car-wheel mounted upon the wheel-arbor, and means for securing the cylindrical cap and the car-wheel together.

HIRAM P. WILLARD.

Witnesses
  JAMES R. TOWNSEND,
  ALFRED I. TOWNSEND.